Figure 1:
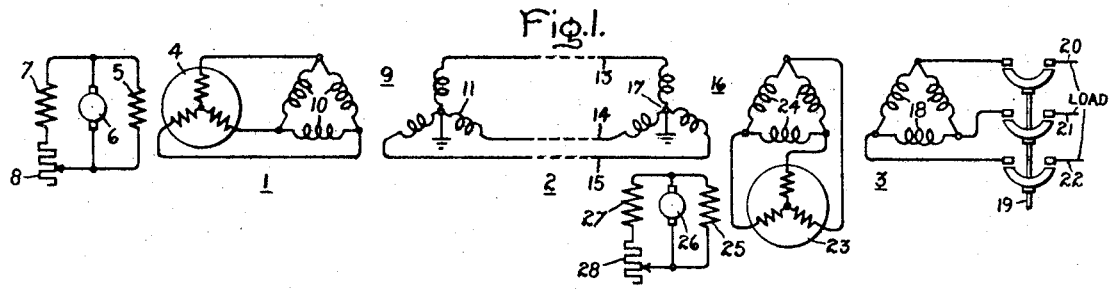

May 2, 1944.   H. A. PETERSON   2,348,026

ELECTRIC POWER TRANSMISSION SYSTEM

Filed May 28, 1942   2 Sheets-Sheet 1

Inventor:
Harold A. Peterson,
by Harry E. Dunham
His Attorney.

May 2, 1944.　　　H. A. PETERSON　　　2,348,026
ELECTRIC POWER TRANSMISSION SYSTEM
Filed May 28, 1942　　　2 Sheets-Sheet 2
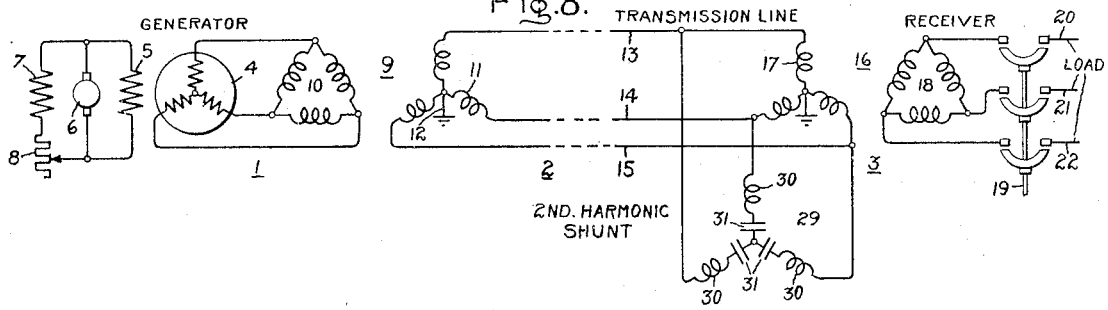
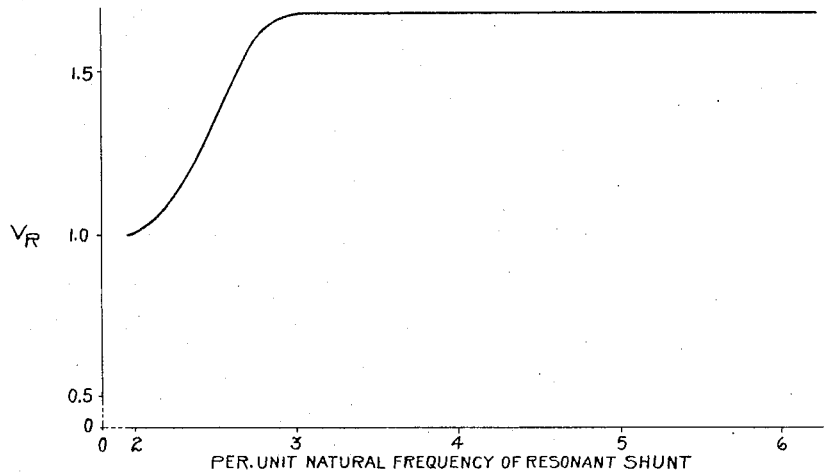
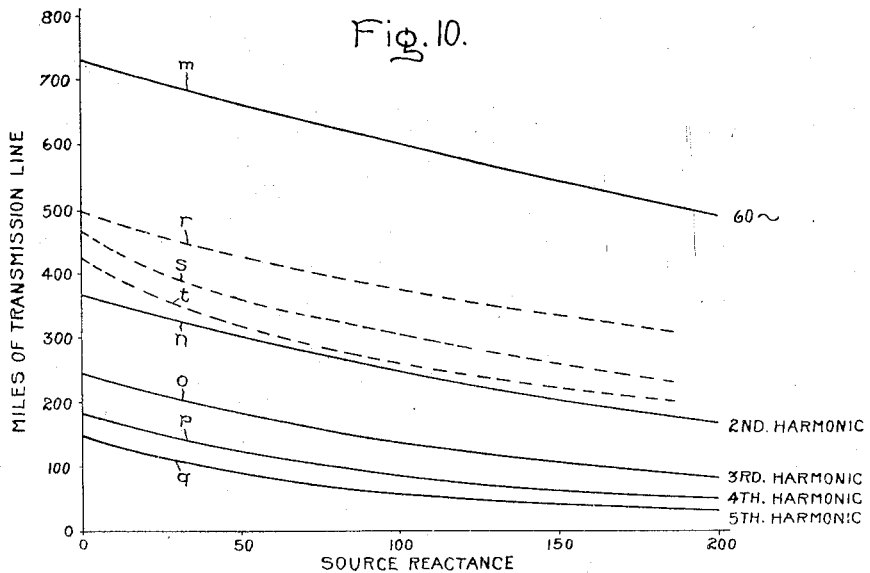
Inventor:
Harold A. Peterson.
by Harry E. Dunham
His Attorney.

Patented May 2, 1944

2,348,026

UNITED STATES PATENT OFFICE 2,348,026

ELECTRIC POWER TRANSMISSION SYSTEM

Harold A. Peterson, Scotia, N. Y., assignor to General Electric Company, a corporation of New York Application May 28, 1942, Serial No. 444,861

8 Claims. (Cl. 172—237)

My invention relates to electric power transmission systems and more particularly to high voltage transmission systems having an electrically long transmitting circuit between the generating and receiving stations.

An electrically long line as herein referred to includes any length of line in which the line capacitance has an appreciable or significant effect in the design and operating characteristics of the line and system. In one of its more specific aspects, my invention is concerned with the transmission of electric power at high voltages over distances of from 300 to 400 miles as contrasted with the longest present lines of from 200 to 250 miles. There is, however, no definite boundary between so-called "short" lines and "long" lines, and some of the phenomena which I have observed are not readily assigned to definite lengths of lines unless the many variable factors involved are specified.

I have found that in electrically long lines of the type above referred to when lightly loaded, or actually unloaded with the primary winding of the receiver transformer connected to the transmission line, severe distortion, or overvoltages with crest values of the order of three or more times normal, occur in the line to neutral voltage of the primary winding of the receiver transformer. The greatest overvoltage was found to occur on 60 cycle lines between line lengths of from 300 to 370 miles with a normal operating voltage at the receiver station corresponding to 230 or 287 kilovolts and a receiver transformer of 240,000 kva. with a normal operating magnetic density of 85 kilolines per square inch. My investigations indicated that any 60 cycle transmission line greater than 200 miles may exhibit the type of overvoltages mentioned depending upon the operating conditions imposed; the degree and severity of the overvoltage, however, depends upon the many variable factors such as source voltage, lenght of line, source reactance, degree of saturation, etc.

For all lengths of line studied, the line when open circuited at the receiver end with the switching on the primary side of the receiver transformer behaved in accordance with transmission line theory involving hyperbolic functions with the usual expected rise in receiver voltage due to the effect of the charging current of the line. Heretofore, it has been assumed that if the load is dropped at the low side of the receiving transformers with the primary winding energized from the line, the increased magnetizing current of the transformer flowing over the line would reduce the line voltage rise. This assumption has been proved to be generally correct in existing commercial lines. The longest present lines are on the lower limit of distance where the overvoltage phenomenon above referred to may be exhibited under some operating conditions of the system, and the new lines now contemplated of greater distances than present lengths will exhibit, according to my investigations, dangerous overvoltage conditions under the condition of low side switching at the receiver end of the line unless means are provided to suppress or eliminate such overvoltages.

It is an object of my invention to provide a new and improved transmission system.

It is another object of my invention to provide a new and improved transmission system which may be operated at light loads, or unloaded by switching on the low voltage side of the receiver transformer, without causing dangerous or harmful overvoltages at the receiver transformer irrespective of the length of the line.

Briefly stated, a specific embodiment of my invention involves a conventional transmission system in which the generating and receiving transformers are interconnected by a transmission circuit having the electrical constants of an overhead line of the order of 200 to 400 miles on a 60 cycle basis and operated at a high voltage of the order of 200 to 300 kilovolts, and wherein the receiver load is switched on the low side of the receiver transformer or wherein the system may be operated at light loads. So far as I have been able to determine, the overvoltage condition is due primarily to a particular relation which arises between the phenomena accompanying the saturation of the receiver transformer under the conditions of operation specified and a particular length of line or value of line capacitance. In accordance with one aspect of my invention, I eliminate or substantially reduce the overvoltage phenomenon by preventing saturation of the receiver transformer or by reducing the degree of saturation thereof. In accordance with another aspect of my invention, I permit saturation to occur but eliminate the principal harmonic voltage in the overvoltage wave occasioned by saturation and thereby reduce the crest value of the overvoltage to a harmless value.

My invention will be better understood by reference to the following description taken in connection with the accompanying drawings, and its scope will be pointed out in the appended claims.

Figure 2:
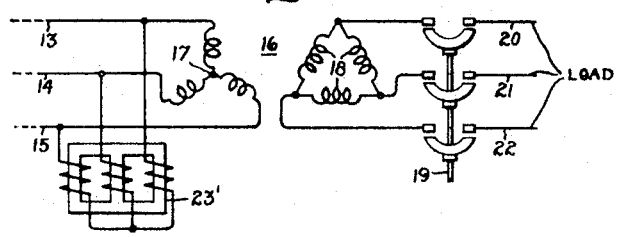
Figure 3:
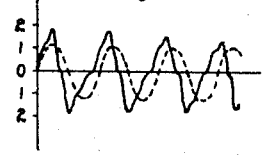
Figure 4:
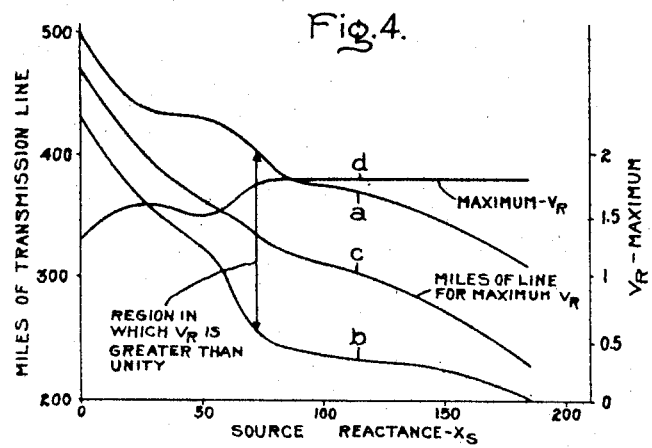
Figure 5:
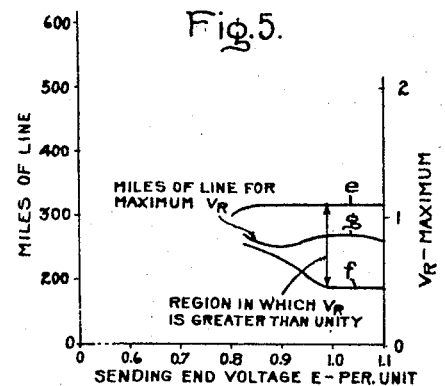
Figure 6:
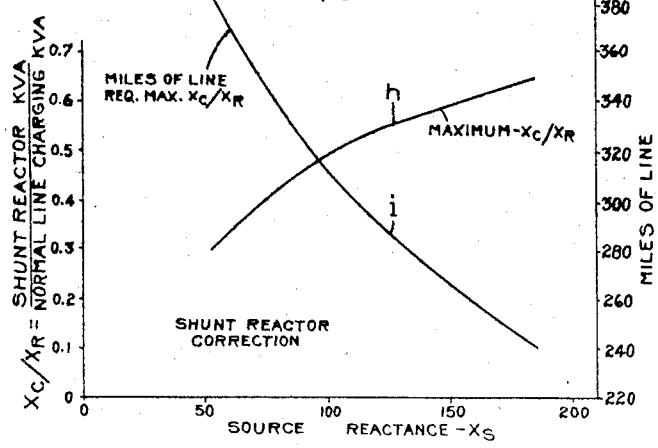
Figure 7:
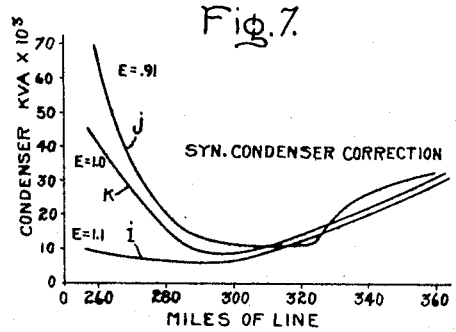

In the drawings, Figs. 1 and 2 are diagrammatic representations of similar embodiments of my invention in which means are utilized to suppress or prevent saturation of the receiver transformer and thereby the overvoltage phenomenon; Figs. 3, 4 and 5 are diagrams derived from oscillograms and test curves showing certain features of the overvoltage phenomenon; Figs. 6 and 7 are explanatory diagrams relative to the embodiments of my invention illustrated by Figs. 1 and 2; Fig. 8 is a diagrammatic representation of another embodiment of my invention utilizing a harmonic shunt as the corrective means, and Figs. 9 and 10 are explanatory diagrams relative to the embodiment of my invention illustrated by Fig. 8.

Referring to Fig. 1 of the drawings, I have shown my invention as embodied in a three phase transmission system comprising a generating station 1, a power transmission circuit 2 and a receiving station 3. The generating station 1 comprises an alternating current generator 4 which is provided with a field winding 5. The field winding 5 is connected to be energized by any suitable exciter 6 having a field winding 7 and a regulating or excitation control means represented by the variable resistor 8. The terminals of the generator are connected to a step-up transformer 9 which is provided with a primary winding 10 and a secondary winding 11. In the particular system which I have studied, the primary winding was connected in delta and the secondary winding was connected in Y with the neutral terminal grounded as indicated at 12. The transmission line is represented by the three phase conductors 13, 14 and 15. The receiving station 3 comprises a step-down transformer 16 which is provided with a primary winding 17 and a secondary winding 18. As illustrated, the primary winding 17 is connected Y with the neutral terminal grounded as indicated at 12 and the secondary winding 18 is connected delta. The transformers 9 and 16 are provided with laminated iron cores as is customary in present day transformers utilized in transmitting many watts or kilowatts for industrial power purposes. The terms "electric power" and "electric power transmission systems" are used throughout the description and claims to denote that field of electric power transmission wherein the frequency is substantially constant and the maximum fundamental frequency is substantially less than the maximum frequency necessary for audio communication. Although the generator station and receiver station transformers are illustrated as connected in a particular manner, I have not found that the overvoltage phenomenon arises by reason of particular connections of the transformers, nor have I found that the overvoltage phenomenon has any direct or significant dependence upon a ground return circuit. The secondary winding 18 is connected through switching means 19 to three phase conductors 20, 21 and 22 which are intended to denote a conventional load circuit.

Since the overvoltage phenomenon appears to be due primarily to a combination of effects involving the saturation phenomena associated with the receiving end transformer and certain lengths of transmission lines and, therefore, more generally certain values of shunt capacitance of the line, I believe the instability and voltage distortion resulting in the overvoltage of the receiver transformer may be attributed to a condition of nonlinear resonance. Nonlinear resonance is usually associated with a capacitance-inductance circuit where the inductance is abruptly variable with current, such as in iron-clad inductive devices subject to saturation. In non-linear resonance certain resonance effects are exhibited during a portion of each cycle of voltage, and thereby high peaks of voltage or current are exhibited. In accordance with my invention I render the circuit dissonant by changing the relation of the capacitance-inductance values of the circuit.

Fig. 3 illustrates, by means of reproductions from oscillograms, the normal and overvoltage wave forms, respectively, which were exhibited in the line-to-neutral voltage of a receiving transformer at the end of a transmission line of the order of 320 miles. The dotted curve indicates the voltage curve when the generator voltage was reduced to about 80 per cent of its normal value so that saturation of the receiving transformer was not present to any significant extent and the abnormal voltage conditions were absent. The solid curve indicates the voltage curve when the generator was operated at its normal value of terminal voltage (taken as unity on the scale indicated) so that the receiving transformer was operating under saturation conditions. The overvoltage condition is definitely indicated both by wave distortion and a high crest value of two times the normal value of unity. It will be observed that the voltage waves were made up of several frequency components, both higher and lower than the fundamental.

Fig. 4 shows the effect of source reactance $X_s$ in a general way. The curves $a$, $b$ and $c$ are plotted between miles of line as ordinates and value of source reactance $X_s$ in ohms as abcissae. The curves $a$ and $b$ indicate the regions or bands which are necessary to define the relationship between miles of line and source reactance. The regions defined establish the boundaries within which $V_R$ is greater than unity. The quantity $V_R$ expresses a ratio between the voltage at the receiver transformer terminals with the receiver transformer primary winding connected to the transmission line and the voltage at the end of the line with the transformer primary disconnected. In other words, if there were no voltage rise other than that due to the normal effect of the line charging current, the value of $V_R$ would be unity. The curve $c$ near the center of the band width gives the relationship between miles of line and source reactance that produces maximum $V_R$. Curve $d$ is also plotted to show the maximum value of $V_R$ in terms of source reactance. Curves of this type permit a quick check to determine if any particular system is likely to be subject to overvoltages of the type discussed. This wide band effect is characteristic of circuits involving non-linear impedances such as saturable inductive devices.

Since the saturation of the receiver transformer appears to be one of the contributing factors in causing the overvoltage phenomenon, it might be concluded that one solution to the problem would be to reduce the normal operating flux density of the receiving transformer to about 70% of that normally used by a change in transformer structure. Such a procedure would solve the difficulty but if accomplished by special transformer construction it means a considerable increase in size and cost as well as a departure from established transformer design practices. The phenomenon can also be reduced in severity or completely eliminated if sufficient resistance is present in the transmission line.

However, in a practical line such as would be constructed for long distance, high-voltage power transmission, the ratio of resistance to reactance of the line would probably be of the order of 0.15. Consequently, it does not appear that this phenomenon is likely to be eliminated by line losses in large power systems.

In accordance with one aspect of my invention, I utilize an inductive shunting device preferably connected at or near the terminals of the receiver transformer. The inductive shunting device may be a synchronous machine 23 as shown in Fig. 1 and operated in a manner to draw a lagging current. Preferably, the synchronous machine 23 is a synchronous condenser operated so as to draw a particular value of lagging current or, stated another way, to supply a particular value of leading reactive kva. to the line. This machine is connected at or near the terminals of the primary winding of the receiver transformer and as shown is connected to a tertiary winding 24 of the receiver transformer. The synchronous condenser 23 is provided with an excitation winding 25 and a source of excitation indicated by the exciter 26 which is provided with an excitation circuit indicated by the winding 27 and a regulating or control means indicated by the variable resistor 28.

In Fig. 2, I have shown another form of the inductive shunting device which is illustrated as a three-phase reactor 23' connected directly to the terminals of the primary winding 17 of the receiver transformer. It will, of course, be understood that the entire transmission system as shown in Fig. 1 is included in the general combination shown, but that for purposes of simplifying the drawings it is believed only necessary to illustrate the receiver end of the system in which the elements corresponding to those of Fig. 1 are designated by like numerals.

Although shunt reactors and synchronous condensers have been connected at or near the receiver terminals of transmission lines heretofore, such devices, to my knowledge, have not had the constants or the characteristics and the particular correlation with the characteristics of the transmission system to prevent or suppress the overvoltage phenomenon discussed herein. The criterion in long lines, such as the Big Creek to Los Angeles 50 cycle line of 240 miles, has been to utilize a synchronous condenser at the receiver station so as to maintain a constant voltage at each end of the line over the whole range of load from no load to full load. With no load on the line, the synchronous condenser is operated so that half of the charging current will come from the synchronous condenser and half from the generators. This prior use of the synchronous condenser at the end of a long line has been merely to compensate for the normal transmission line rise due to the charging current. The result is that the terminal voltages are held normal and equal with a rise of voltage at the center. In so far as the synchronous condenser is used for controlling the voltage rise at the receiver terminal due to the charging current, it might with advantage be replaced with a shunt reactor as has been suggested or used heretofore. In both cases the reactive kva. of the devices has been chosen merely to neutralize the effect of the distributed capacitance of the line and to hold the receiver voltage at its normal value as regards the rise due solely to the charging current. Under the condition of operation with the synchronous condenser holding normal voltage and consequently normal flux density at the receiver transformer, the system does not avoid the overvoltage phenomenon here referred to by reason of the synchronous condenser but by reason of the fact that the length of line is below that value for which the phenomenon occurs. The 240 mile line is a 50 cycle line and on the basis of 60 cycles corresponds to a line length of 200 miles, which with a commercial value of source reactance of the order of 100 ohms is not indicated by my studies to be subject to the overvoltage phenomenon herein referred to.

In accordance with one aspect of my invention and my conception of the problem, it is necessary to "load" the transmission line at or near the receiver terminals by an inductive reactance device or a resistance (which I do not consider as practical or economical as a shunt reactor or synchronous condenser) to such an extent that the voltage applied to the primary of the receiver transformer under light load, or with the load disconnected on the secondary side of the transformer, is below that value of voltage at which the transformer operates at its normal operating flux density as contrasted with prior art practice of holding normal flux density or normal voltage at the receiver transformer.

Fig. 5 shows the effect of the value of the receiver transformer voltage as determined by a large number of curves and shown by the plotted curves of the figure in terms of per unit sending end voltage E and miles of transmission line. In these curves E equal to unity is defined as that point on the transformer saturation curve corresponding to the normal operating flux density of 85 kilolines per square inch. Under normal or full load conditions, the actual voltage at the receiver transformer terminals in a system such as is being considered here would be somewhat less than the voltage at the sending end. However, at no load the voltage rises along a transmission line in proportion to a sine wave; the receiving end being at the crest of the wave. A rough estimate of the voltage rise due to the capacitance of the line may be obtained by considering the receiver voltage as unity so that the generated voltage is proportional to the cosine of the length of the line expressed in degrees. At a frequency of 60 cycles each, 8⅓ miles of line may be considered a degree on the basis of 3000 miles per wave length and, hence, a line 340 miles long may be expressed as a 40.8 degree line. As the cosine of 40.8 degrees is 0.757 it follows that the generator voltage is roughly 76 per cent of the receiver voltage. On the other hand for unity voltage at the receiver with a 0.76 generator voltage there is a 31.6 per cent rise in generator voltage. With the primary winding of the receiver transformer connected and the accompanying transformer magnetizing current effects, we may assume the net voltage rise due to the line charging current alone to be less than for the open circuit condition and to be of the order of 20 to 25 per cent. By reference to Fig. 5, it will be observed that if the sending end voltage is 0.8 and there is a rise of 20 per cent the receiver voltage would not equal unity and the ratio of $V_R$ would be unity or less. However, if we assume a sending end voltage of 1.0 which is a normal operating condition a voltage rise of 20% would cause a voltage of 1.2 to be impressed on the receiver transformer and it is indicated that any line length between 250 and 390 miles would exhibit the overvoltage phenomenon with $V_R$ greater than unity and that a line 340 miles long would exhibit the greatest overvoltage condition.

Fig. 6, curve $h$, shows the relation between the source reactance and the maximum value of corrective shunt reactor kva. required which is expressed by the ratio $X_C/X_R$, or ratio of the shunt reactor kva. to the normal line charging kva. The reactor kva. of such reactors is selected in dependence upon the value of the source reactance and the length of transmission line. Substantially non-saturating reactors should be used since saturable reactors would introduce the same saturable phenomena as the saturation or the receiver transformer. It will be observed that as the source reactance is increased, a higher reactor kva. is required to reduce $V_R$ to unity in the unstable region. This apparently follows from the fact that for a given charging current a greater rise of voltage is obtained at the receiver transformer for the higher value of source reactance since a leading current flowing through a series inductance causes a rise in voltage in proportion to the series inductance. Hence, it requires a greater value of shunt reactor kva. as the source reactance increases to keep the receiver voltage below that value which causes the saturation phenomena at the receiver transformer. Curve $i$ indicates the relation between the miles of lines which require maximum $X_C/X_R$ and source reactance. Since source reactance is in effect equivalent to a certain number of miles of line, it follows that as the source reactance is increased shorter and shorter lines will require maximum $X_C/X_R$. Hence, with 100 ohms source reactance it is indicated that a line 310 miles long will require maximum $X_C/X_R$ whereas with 150 ohms source reactance a line only 265 miles long would require maximum $X_C/X_R$. If a line is arranged so that it can be opened at either end, with either end operating as a receiver transformer, the corrective inductive devices would have to be located at each terminal transformer for selective use depending upon which end is the receiver and thus the installed corrective reactive kva. would be double that of a single receiver terminal line.

Fig. 7 shows the synchronous condenser kva. required for corrective purposes in relation to the number of miles of line. The curves $j$, $k$ and $l$ show the different requirements for three different values of source voltage and a single value of source reactance. It is important to note that the conditions which give rise to maximum overvoltages without the synchronous condenser do not require the highest value of condenser kva. to reduce $V_R$ to unity. That is, in the region of line lengths of 300 to 340 where the greatest overvoltages are exhibited the corrective kva. is less than for shorter or longer lines. There is also a further variation from expected results in the fact that for lines below lengths of the order of 310 miles the corrective kva. is greater as the source voltage is decreased. In order to avoid the possibility of overvoltage trouble at all times, it is necessary to insure that the shunt corrective means and receiving transformer do not become separated from each other by any switching operation while the receiver transformer primary winding is connected to the transmission line.

In Fig. 8 I have shown another embodiment of my invention in which the system of transmission is illustrated as in Fig. 1 with corresponding elements being designated by like numerals. In this embodiment, I utilize a different principle of correction as contrasted with what might be termed the brute-force method of the embodiment illustrated in Figs. 1 and 2. In accordance with this embodiment of my invention, I use a harmonic shunt or filter 29 connected across the terminals of the receiver transformer. This filter is tuned preferably to the second harmonic of the fundamental of the same but it may be desirable, as pointed out later, to tune for a harmonic somewhat greater than the second but less than the third. The filter may take various forms well known in the art, but I have found that a plurality of inductance elements 30 and capacitance elements 31 arranged as a pair in series in each leg may be connected in the form of a Y network for satisfactory results. The kva. rating of the inductance and capacitance elements of the shunt have been indicated as being considerably less than the kva. requirements of shunt reactors or synchronous condensers and, hence, this arrangement would be less expensive than shunt reactors or synchronous condensers.

After a large number of tests covering lines from 200 to 600 mile lengths and other variable conditions heretofore noted, I have found that the series or resonant shunt tuned to substantially the second harmonic was the only character of shunt which was effective in eliminating the abnormal condition entirely. Shunts tuned to the third, fourth and fifth harmonics were not found to be effective.

Fig. 9 shows the effectiveness of the filters in reducing $V_R$ to unity (the desired ratio at which the overvoltage phenomenon is eliminated) in dependence upon the harmonic to which the filter is tuned. This curve shows that for second harmonic tuning the ratio is reduced to unity, and that the tuning to a higher additional fractional harmonic to the second has some effect up to the third but that for the third and higher harmonics no reduction in $V_R$ is effected. In view of the effect of possible overspeeding of the generator, it may be desirable to tune to some additional fractional value of the second harmonic as referred to the normal fundamental frequency of the generator such as 2.2 up to 2.9. This variation from the second harmonic of the fundamental of the generator at normal speed may be the second harmonic of the fundamental at the higher speed. Hence, in the use of the expression "substantially the second harmonic" in the specification and claims, it is my intention to include such variation as has been indicated. It is clear that with generator overspeeding, following sudden loss of load, line lengths not normally subject to the overvoltage phenomenon may become subject to it, because of the increased frequency. Hence, certain line flashovers and overvoltage troubles heretofore unexplained on some of the longer commercial lines now in operation in this country might possibly be obviated in accordance with the various embodiments of my invention having due regard to the conditions under which the overvoltage phenomenon arises.

Fig. 10 gives some indication of why the second harmonic is a contributing factor in the overvoltage phenomenon. The curves of this figure are plotted between source reactance and length of line for which the impedance looking from the receiver transformer is infinite for the frequencies indicated. The curves $m$, $n$, $o$, $p$ and $q$ really show the length of a quarter wave length line at the frequencies indicated. For example, a quarter wave length line operated at 60 cycles with zero source reactance is of the order of 750 miles on the basis of a 3000 mile wave length. As the source reactance is increased, the length of a line for quarter wave length phenomenon decreases. Similarly, the quarter wave length of line for the second harmonic is of the order of 375 miles for zero source reactance and a decreasing length of line as the source reactance increases. The dotted curves *n* and *t* show the relation between source reactance and miles of transmission and the boundaries within which the relation $V_R$ is greater than unity or, in other words, the region on which the overvoltage phenomenon is exhibited. The dotted curve *s* running between *r* and *t* shows the relation between source reactance and miles of line for which the relation $V_R$ is a maximum. It will be observed that the line lengths exhibiting the quarter wave length phenomenon for the second harmonic is on the border of the danger zone in which the overvoltage phenomenon arises. The phenomenon appears to be most pronounced in the region from 300 to 370 miles of line when the line is operated with the constants and design features of present day practice.

Although I do not wish to be bound by a statement of my theories of the underlying scientific principles of the overvoltage phenomenon, and in fact am not so bound, I believe it will be helpful in conveying an understanding of the operation of my invention to recite some of the theories which in my observations appear to be involved. As I have previously indicated, the overvoltage phenomenon is dependent primarily upon saturation of the receiver transformation in combination with a certain relation which arises with the line capacitance so that some condition of nonlinear resonance exists. The overvoltage waves as shown in Fig. 3 were made up of several frequency components both higher than the fundamental and sub-harmonics thereof. The subharmonic phenomenon appears to be largely responsible for the high overvoltages obtained by causing an oscillating bias effect which gives rise to second harmonic voltages. It is commonly recognized that in an iron core subject to saturation, energy can be put in at fundamental frequency and drawn out at a higher harmonic frequency, such as the second or third. When the ratio is even and exact, for instance when the oscillation takes place at exactly one-half of the impressed frequency, a bias is obtained by a residual flux in the core. The residual flux will persist if the oscillation has otherwise the right constants to persist.

In any event, a large second harmonic voltage appears in the leg voltage of the receiver transformer and in the absence of the required second harmonic current in the magnetizing current of the transformer the second harmonic voltage will persist. By connecting the second harmonic shunt at or near the terminals of the receiver transformer, I permit the second harmonic components of magnetizing current to flow and thus the transformer leg voltage will not be distorted due to any second harmonic voltage. In fact, the second harmonic shunt was very effective in eliminating entirely the abnormal voltage conditions at the receiver transformer.

While I have shown and described particular embodiments of my invention, it will be apparent to those skilled in the art that changes and modifications may be made without departing from my invention, and I, therefore, aim in the appended claims to cover all such changes and modifications as wall within the true spirit and scope of my invention.

What I claim as new and desire to secure by Letters Patent of the United States is:

1. In an electric power transmission system, a source of alternating current, a receiving station comprising a transformer having a primary winding and a secondary winding, an electrically long transmission circuit interconnecting said source and said primary winding, a load circuit connected to be energized from said secondary winding, switching means for disconnecting said load circuit by causing interruption of the circuit between said load circuit and said secondary winding while said primary winding remains connected to said transmission circuit, said receiving station transformer exhibiting magnetic saturation at or above the rated terminal voltage of said system so that its inductance varies with current thereby causing at the primary winding of said receiving station transformer subharmonic and harmonic voltages of the fundamental frequency of said source and resulting in an overvoltage in addition to the inherent fundamental-frequency voltage rise of said transmission circuit upon light or no-load conditions of operation of said system, and an inductive reactance connected in parallel relation to said transmission circuit for preventing the production of a second harmonic in the voltage of said transformer and having an inductive reactive kilovolt-ampere rating at least 25 per cent in excess of the shunt inductive reactance required to prevent said inherent fundamental-frequency voltage rise.

2. In an electric power transmission system, a source of alternating current, a receiving station comprising a transformer having a primary winding and a secondary winding, an electrically long transmission circuit interconnecting said source and said primary winding, a load circuit connected to be energized from said secondary winding, switching means for disconnecting said load circuit by causing interruption of the circuit between said load circuit and said secondary winding while said primary winding remains connected to said transmission circuit, said receiving station transformer exhibiting magnetic saturation at or above the rated terminal voltage of said system so that its inductance varies with current thereby causing a voltage rise at said receiving station as a result of subharmonic and harmonic voltages of the fundamental-frequency of said source in addition to the inherent fundamental-frequency voltage rise of said transmission circuit upon light or no-load conditions of operation of said system, and an inductive reactance connected in parallel relation with said transmission circuit at said receiving station for suppressing said overvoltage due to harmonics and subharmonics of the fundamental frequency of said system and having an inductive reactive kilovolt-ampere capacity of the order of 25 to 70 per cent of the normal line charging kilovolt-amperes in excess of the kilovolt-amperes inductive reactance required to prevent said fundamental-frequency voltage rise.

3. In an electric power transmission system, a generating station, a load circuit, a receiving station comprising a transformer having a secondary winding for connection to said load circuit and a primary winding which exhibits saturation phenomena at or above the rated receiving terminal voltage of said system, an electrically long transmission line interconnecting said generating and receiving stations and having a shunt capacitance which in combination with the saturation phenomena of said receiver transformer upon disconnection of said load circuit from said secondary winding produces a voltage ratio greater than unity between the voltage of said primary winding when connected to said line and the voltage at the end of said line when the primary winding is disconnected from said line, and impedance means connected to said transmission line of an inductive reactive kilovolt-ampere capacity in excess of that required to maintain the voltage constant at the end of said line when said primary winding is disconnected from said line and having such excess inductive reactive kilovolt-ampere capacity as to maintain said voltage ratio at unity upon disconnection of said load circuit from said secondary winding while said primary winding is connected to said transmission line.

4. In an electric power transmission system, a generating station, a receiving station comprising a transformer having a primary winding and a secondary winding, said transformer exhibiting saturation phenomena at or above the rated receiving terminal voltage of said system, an electrically long transmission circuit interconnecting said generating and receiving stations, a load circuit connected to be energized from said secondary winding, switching means interposed between said load circuit and said secondary winding whereby load-side switching is a condition of operation in said system, a synchronous condenser connected in parallel relation to said transmission circuit at said receiving station for suppressing in said transmission circuit rises in voltage caused by harmonic and subharmonic voltages of the fundamental frequency of said primary winding and having an inductive reactive kilovolt-ampere capacity at least 15 per cent in excess of the inductive-reactive kilovolt-ampere capacity required of said synchonous condenser to suppress the fundamental-frequency voltage rise of said transmission circuit when said load circuit is disconnected from said secondary winding, and connections between said synchronous condenser and said transmission circuit for keeping said synchronous condenser connected to said transmission circuit upon disconnection of said load circuit from said secondary winding.

5. In an electric power transmission system, a source of alternating current, a transmission circuit, a receiving station connected to be energized from said transmission circuit and comprising a transformer having an inductance abruptly variable with current at or above the rated receiving terminal voltage of said transmission circuit, said transmission circuit being of a length which is of the order of a quarter wave length for the second harmonic of the fundamental frequency of said source, and means connected in parallel relation with said transmission circuit for changing the reactance of said transmission system in an amount sufficient to maintain said system dissonant to nonlinear resonance phenomena when said system is operated under light or no-load conditions.

6. In an electric power transmission system, a source of alternating current, a receiving station comprising a transformer having an inductance variable with current and abruptly saturable at substantially the rated receiving terminal voltage of said system, a transmission circuit interconnecting said source and said receiving circuit, said transmission circuit having a length less than a quarter wave length of the transmission circuit at the fundamental frequency of said source and equal to or greater than a quarter wave length of the second harmonic frequency of the fundamental frequency of said source, and impedance means connected in parallel relation to said transmission circuit for changing the relative values of the normal constants of said transmission system to maintain said system dissonant to nonlinear resonance phenomena when said receiving circuit is operated under light or no-load conditions.

7. In an electric power transmission system, a source of alternating current, a receiving station comprising a transformer having an inductance variable with current and abruptly saturable at or above the rated receiving terminal voltage of said system, an electrically long transmission circuit interconnecting said source and said receiving station, and an electric filter series tuned to substantially the second harmonic only of the fundamental frequency of said source and connected in parallel relation with said transmission circuit.

8. In an electric power transmission system, an alternating current generating station, a receiving station including a transformer having a primary winding and exhibiting saturation phenomena when said receiving station is operated at light or no-load conditions with the primary winding connected to the system for energization, an electrically long transmission circuit interconnecting said generating station and said receiving station, and an electric filter connected at or near the terminals of said primary winding in parallel relation therewith and comprising a reactor and a capacitor connected in series relation relative to said transmitting circuit and tuned to substantially the second harmonic of the fundamental frequency of said generating station.

HAROLD A. PETERSON.